US012147488B2

(12) United States Patent
Rogers

(10) Patent No.: US 12,147,488 B2
(45) Date of Patent: Nov. 19, 2024

(54) QR CODE COMPLIANCE METHOD AND SYSTEM

(71) Applicant: QR CODE COMPLIANCE, PLLC, Houston, TX (US)

(72) Inventor: Charles John Rogers, Houston, TX (US)

( * ) Notice: Subject to any disclaimer, the term of this patent is extended or adjusted under 35 U.S.C. 154(b) by 147 days.

(21) Appl. No.: 17/587,831

(22) Filed: Jan. 28, 2022

(65) Prior Publication Data

US 2022/0237252 A1 Jul. 28, 2022

Related U.S. Application Data

(60) Provisional application No. 63/143,022, filed on Jan. 28, 2021.

(51) Int. Cl.
*G06F 16/955* (2019.01)
(52) U.S. Cl.
CPC ................ *G06F 16/9554* (2019.01)
(58) Field of Classification Search
CPC .................................. G06F 16/9554
See application file for complete search history.

(56) References Cited

U.S. PATENT DOCUMENTS

2008/0228822 A1* 9/2008 Jarboe .................... G06Q 10/10
2014/0244416 A1* 8/2014 Venkat ............... G06Q 30/0603
705/26.1

(Continued)

*Primary Examiner* — Grace Park
(74) *Attorney, Agent, or Firm* — Michael A Blake

(57) ABSTRACT

A software system comprising a non-transitory computer-readable medium, where the medium includes a set of instructions stored thereon that when accessed by a processor enable the processor to perform a method of creating an internet product page, the method comprising: adding a product to the system; querying a subscriber for information; generating an internet product page displaying information from the subscriber queries; generating a QR code; and downloading the QR code to the subscriber. A software system comprising a non-transitory computer-readable medium, where the medium includes a set of instructions stored thereon that when accessed by a processor enable the processor to perform a method of creating a substantially compliant internet product page and for alerting subscribers of new requirements for substantially compliant internet product pages, the method comprising: adding a product to the system; querying a subscriber as to which states the product will be sold in; querying the subscriber for product information; querying the subscriber for batch information; querying the subscriber for ingredients and ingredients information; querying the subscriber for certificate of analysis; generating a dynamic QR code; generating a substantially compliant internet product page, displaying information from subscriber queries; querying the subscriber whether to link the dynamic QR code to the generated substantially compliant internet product page or link the dynamic QR code to another internet product page; redirecting traffic from URL address encoded in QR code to the internet product page selected by the subscriber; previewing internet product page selected by the subscriber; querying the subscriber if internet product page will be published or will be kept private; publishing internet product page if the subscriber elected to publish; and downloading QR code to the subscriber. The invention is also related to a software system comprising a non-transitory computer-readable medium, where the medium includes a set of instructions stored thereon that when accessed by a processor enable the processor to perform a method of creating a substantially compliant internet product page and for alerting subscribers of new requirements for substantially compliant internet product pages, the method comprising: querying an admin- (Continued)

istrator to select new state to add or select previously entered state to edit; querying the administrator whether state requires QR codes on products; adding new state to list of states for subscribers to select from, if a new state is being added; querying the administrator for each item of information required by the selected state; adding each item of information required by the selected state as data fields, titles and descriptions, for product information, batch information, and ingredient information, and/or adding titles and/or descriptions with checkable boxes for tests and information required on a certificate of analysis required by the selected state; querying the administrator whether selected state requires new item of information not previously required by other previously entered states; querying the administrator for new item of information required from subscribers; adding new item of information such that a subscriber will see the new item of information if the subscriber choses the selected state as a state subscriber's product will be sold in; querying the administrator whether to send notification to subscribers who had previously selected the selected state as a state subscriber's product will be sold in; and sending notification to the subscriber if the administrator elects to send notification. A software system comprising a non-transitory computer-readable medium, where the medium includes a set of instructions stored thereon that when accessed by a processor enable the processor to perform a method of creating a substantially compliant internet product page and for alerting subscribers of new requirements for substantially compliant internet product pages, the method comprising: querying an administrator to select new state to add or select previously entered state to edit; querying the administrator whether state requires QR codes on products; adding new state to list of states for subscribers to select from, if a new state is being added; querying the administrator for each item of information required by the selected state; adding each item of information required by the selected state as data fields, titles and descriptions, for product information, batch information, and ingredient information, and/or adding titles and/or descriptions with checkable boxes for tests and information required on a certificate of analysis required by the selected state; query-ing the administrator whether selected state requires new item of information not previously required by other previously entered states; querying the administrator for new item of information required from subscribers; adding new item of information such that a subscriber will see the new item of information if the subscriber choses the selected state as a state subscriber's product will be sold in; querying the administrator whether to send notification to subscribers who had previously selected the selected state as a state subscriber's product will be sold in; sending notification to the subscriber if the administrator elects to send notification; adding a product to the system; querying the subscriber as to which states the product will be sold in; querying the subscriber for product information; querying the subscriber for batch information; querying the subscriber for ingredients and ingredients information; querying the subscriber for certificate of analysis; generating a dynamic QR code; generating a substantially compliant internet product page, displaying information from subscriber queries; querying the subscriber whether to link the dynamic QR code to the generated substantially compliant internet product page or link the dynamic QR code to another internet product page; redirecting traffic from URL address encoded in QR code to the internet product page selected by the subscriber; previewing internet product page selected by the subscriber; querying the subscriber if internet product page will be published or will be kept private; publishing internet product page if the subscriber elected to publish; and downloading QR code to the subscriber.

25 Claims, 6 Drawing Sheets

(56) References Cited

U.S. PATENT DOCUMENTS

| | | | |
|---|---|---|---|
| 2015/0032842 A1* | 1/2015 | Cheng | G06Q 30/06 709/217 |
| 2021/0406814 A1* | 12/2021 | Alsayar | G06F 16/9535 |

* cited by examiner

FIG. 4

FIG. 6 under QR CODE COMPLIANCE METHOD AND SYSTEM

CROSS-REFERENCES

This patent application claims priority to provisional patent application No. 63/143,022, filed on Jan. 28, 2021, by Charles John Rogers and titled: "QR Code Compliance" which provisional application is fully incorporated by reference herein.

TECHNICAL FIELD

The present invention relates to a QR code compliance method and system, and more particularly to a QR code compliance method and system that can create, maintain, and update a website that provides required information for compliance with laws and regulations.

BACKGROUND

Several states have laws and regulations requiring the use of scannable bar codes or QR codes on products to allow consumers to access information about the products. Other states have pending or proposed legislation and regulations that may become laws and regulations with similar requirements. Consumers can access information about a product by using their mobile phone to scan a QR code on the product label, which will direct the consumer to a downloadable document, and/or a product information page on the internet. The laws and regulations requiring QR codes on product labels vary as to the particular product information that is required to be provided. The letters Q and R stand for quick response. The word "QR Code" is a registered trademark of Denso Wave Inc. (used herein by permission).

Several states have laws and regulations requiring QR codes on product labels for consumable hemp products, to allow consumers to access product information including a Certificate of Analysis ("COA") with laboratory test results confirming that the products have a THC concentration level at certain limits and/or below the legal limit. Additional product information required may include the batch or lot number, batch date, batch size, expiration date, product name, manufacturer's name. Other requirements governing product testing require further information in the COA including the results of testing for cannabinoids such as CBD, and additional testing such as for pesticides, heavy metals, mycotoxins, and residual solvents.

It is difficult for producers of consumable hemp products to stay up to date on new, current, and changing laws and regulations throughout the country and internationally. In addition, creating, updating, and maintaining websites required to be in compliance with various laws and regulations can be difficult, time consuming, and a technical challenge for producers.

Thus there is a need for a QR code compliance method and system that overcomes the above-listed and other disadvantages.

SUMMARY OF THE INVENTION

The invention is related to a software system comprising a non-transitory computer-readable medium, where the medium includes a set of instructions stored thereon that when accessed by a processor enable the processor to perform a method of creating an internet product page, the method comprising: adding a product to the system; querying a subscriber for information; generating an internet product page displaying information from the subscriber queries; generating a QR code; and downloading the QR code to the subscriber.

The invention is also related to a software system comprising a non-transitory computer-readable medium, where the medium includes a set of instructions stored thereon that when accessed by a processor enable the processor to perform a method of creating a substantially compliant internet product page and for alerting subscribers of new requirements for substantially compliant internet product pages, the method comprising: adding a product to the system; querying a subscriber as to which states the product will be sold in; querying the subscriber for product information; querying the subscriber for batch information; querying the subscriber for ingredients and ingredients information; querying the subscriber for certificate of analysis; generating a dynamic QR code; generating a substantially compliant internet product page, displaying information from subscriber queries; querying the subscriber whether to link the dynamic QR code to the generated substantially compliant internet product page or link the dynamic QR code to another internet product page; redirecting traffic from URL address encoded in QR code to the internet product page selected by the subscriber; previewing internet product page selected by the subscriber; querying the subscriber if internet product page will be published or will be kept private; publishing internet product page if the subscriber elected to publish; and downloading QR code to the subscriber.

The invention is also related to a software system comprising a non-transitory computer-readable medium, where the medium includes a set of instructions stored thereon that when accessed by a processor enable the processor to perform a method of creating a substantially compliant internet product page and for alerting subscribers of new requirements for substantially compliant internet product pages, the method comprising: querying an administrator to select new state to add or select previously entered state to edit; querying the administrator whether state requires QR codes on products; adding new state to list of states for subscribers to select from, if a new state is being added; querying the administrator for each item of information required by the selected state; adding each item of information required by the selected state as data fields, titles and descriptions, for product information, batch information, and ingredient information, and/or adding titles and/or descriptions with checkable boxes for tests and information required on a certificate of analysis required by the selected state; querying the administrator whether selected state requires new item of information not previously required by other previously entered states; querying the administrator for new item of information required from subscribers; adding new item of information such that a subscriber will see the new item of information if the subscriber choses the selected state as a state subscriber's product will be sold in; querying the administrator whether to send notification to subscribers who had previously selected the selected state as a state subscriber's product will be sold in; and sending notification to the subscriber if the administrator elects to send notification.

In addition, the invention is related to a software system comprising a non-transitory computer-readable medium, where the medium includes a set of instructions stored thereon that when accessed by a processor enable the processor to perform a method of creating a substantially compliant internet product page and for alerting subscribers of new requirements for substantially compliant internet product pages, the method comprising: querying an administrator to select new state to add or select previously entered state to edit; querying the administrator whether state requires QR codes on products; adding new state to list of states for subscribers to select from, if a new state is being added; querying the administrator for each item of information required by the selected state; adding each item of information required by the selected state as data fields, titles and descriptions, for product information, batch information, and ingredient information, and/or adding titles and/or descriptions with checkable boxes for tests and information required on a certificate of analysis required by the selected state; querying the administrator whether selected state requires new item of information not previously required by other previously entered states; querying the administrator for new item of information required from subscribers; adding new item of information such that a subscriber will see the new item of information if the subscriber choses the selected state as a state subscriber's product will be sold in; querying the administrator whether to send notification to subscribers who had previously selected the selected state as a state subscriber's product will be sold in; sending notification to the subscriber if the administrator elects to send notification; adding a product to the system; querying the subscriber as to which states the product will be sold in; querying the subscriber for product information; querying the subscriber for batch information; querying the subscriber for ingredients and ingredients information; querying the subscriber for certificate of analysis; generating a dynamic QR code; generating a substantially compliant internet product page, displaying information from subscriber queries; querying the subscriber whether to link the dynamic QR code to the generated substantially compliant internet product page or link the dynamic QR code to another internet product page; redirecting traffic from URL address encoded in QR code to the internet product page selected by the subscriber; previewing internet product page selected by the subscriber; querying the subscriber if internet product page will be published or will be kept private; publishing internet product page if the subscriber elected to publish; and downloading QR code to the subscriber.

BRIEF DESCRIPTION OF THE DRAWINGS

The present disclosure will be better understood by those skilled in the pertinent art by referencing the accompanying drawings, where like elements are numbered alike in the several figures, in which:

FIG. 4 is a screenshot of a top one page of one embodiment of the disclosed system;

FIG. 6 is a screenshot showing the bottom of the page from FIG. 4.

DETAILED DESCRIPTION OF THE INVENTION

Figure 1:
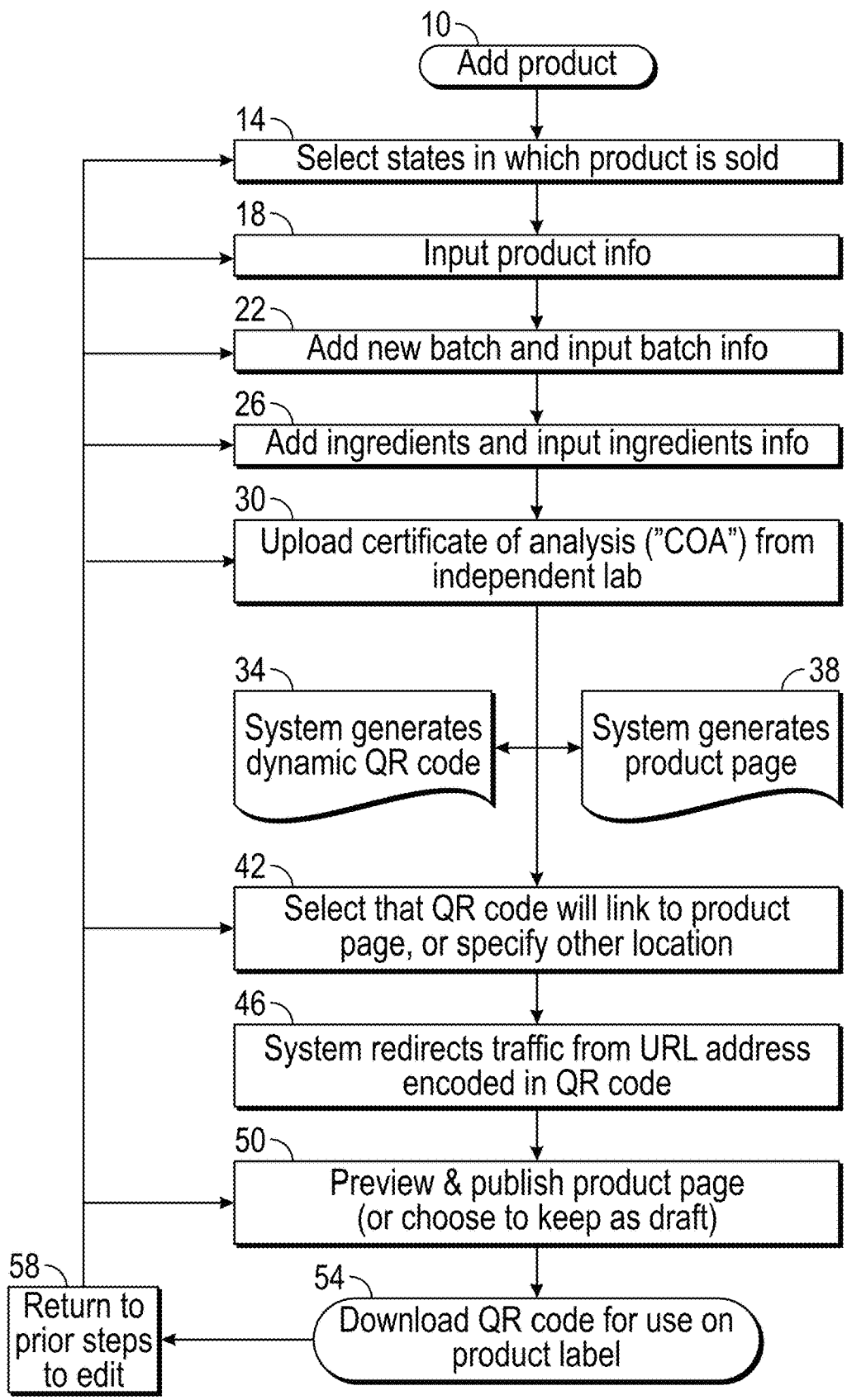
FIG. 1 is a flowchart showing one embodiment of the method of the system.

Manufacturers and retailers of products such as consumable hemp products must comply with the laws and regulations requiring QR codes on product labels. In addition, consumers increasingly view the QR codes on the product labels as a sign of quality, and rely on the ability to use the QR codes to access product information including the lab test results in the downloadable COAs. A need therefore arises for a service to help manufacturers and retailers comply with the laws and regulations requiring QR codes on product labels, and requiring particular product information to be accessible through the scanning of the QR codes, and to help the manufacturers and retailers meet the consumer demand for the QR codes and accessible product information.

The present invention helps manufacturers and retailers comply with laws and regulations requiring QR codes on product labels, and to help them meet the consumer demand for QR codes and accessible product information. Disclosed is a method and system that operates on a computer system configured to allow users including manufacturers and retailers of consumable hemp products to confirm that the particular product information that is required by various states is made available on an internet product page. The disclosed method and system also generates and downloads a QR code that can be used on a product label, and generates a product page on the internet, accessible by consumers who scan the QR code, allowing the consumers to access the product information including downloadable COAs. In addition, the disclosed method and system can alert users when their QR codes and/or product page may not be in compliance with the laws and regulations in their jurisdiction(s).

Because of the numerous, various, and often burdensome nature of the requirements for particular product information and testing, from the numerous and various laws and regulations requiring QR codes on products, many manufacturers and retailers may be unable to fully comply with all of the requirements. With that understanding, when referring to compliance, comply, and compliant herein, these terms are meant to refer to "substantial compliance" and striving to be as compliant as possible, as a more realistic goal for manufacturers and retailers attempting to achieve full compliance.

The disclosed method and system allow users of the application to confirm the particular product information required, enter the product information, upload COAs, generate a QR code, and download the QR code for use on the product label. The software application generates the product information page, which displays the product information to consumers who scan the QR code, and allows consumers to download the COAs. The users can choose to use the product page as a guide to help them include the required product information on their own internet web site, and specify that consumers scanning the QR code will be directed to the user's web site. Or the user can specify that consumers scanning the QR code will be directed to the product information page generated by the disclosed software application.

FIG. 1 is a flowchart showing one embodiment of the method of the system. In this figure, the steps of the front end/subscriber end is shown. In this document, the terms subscriber and user may be used interchangeably. The system may be in communication with a network. The network may be or include the internet, World Wide Web, a local area network, or some other public or private computer, cable, telephone, cellular telephone system, client/server, peer-to-peer, or communication network or intranet. In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc.

At act 10, the subscriber begins the add a product through a series of steps. At act 14, the subscriber selects the states and/or territories in which the product will be sold. In other embodiments, countries may be selected as wells as states, provinces, or other subnational divisions. In this document, states may include states, provinces, countries, and subnational divisions.

At act 18, the subscriber enters the product info. The system may provide data fields and titles and descriptions for the data fields based on the requirements of the states and territories selected by the subscriber. For instance, State A may have laws and regulations that only require a product name, but State B may have laws and regulations that require the product name, name of product manufacturer, address of the product's manufacturer, and email address of the product's manufacturer. Thus, in one embodiment, if the subscriber only selected State A, then at the product information page, only a "product name" field will appear. On the other hand, if the subscriber selects State B, then fields for product name, name of product manufacturer, address of the product's manufacturer, and email address of the product's manufacturer will be provided by the system. The subscriber will then input the requested information and/or data into the data fields. Possible product information fields may include, but are not limited to: Product Name; Product Manufacturer; Address of the Product's Manufacturer; Telephone number of the Product's Manufacturer; Email address of the Product's Manufacturer; Website of the Product's Manufacturer; UPC number for product; SKU for the product; and an image of the product.

At act 22, the subscriber may add a new batch and/or input batch information. Again, states and territories may require different batch information based on the respective laws and regulations in the states and territories. The system will provide the required batch information data fields dependent on the states and territories the subscriber picked at act 14. In one non-limiting example, if a selected state requires no batch information in their laws or regulations, then it is possible the system will provide no batch data fields to be filled in by the subscriber. In another non-limiting example, if the selected state requires extensive batch information in their laws and regulations, then there is likely to be provided by the system an extensive number of data fields (and associated titles and descriptions for each data field) requiring input from the subscriber. Possible batch information data fields may include, but are not limited to: Batch Number; Batch Date; Expiration Date (within 2 yrs of date of manufacture); Batch Size; Total Quantity Produced; Number of milligrams of low THC hemp product; Number of milligrams of CBD in the low THC hemp product; Concentration of cannabinoids present in the product batch; Amount or Percentage of Cannabinoids in each Unit of the Product; Serving size; Number of servings per container; Number of milligrams of each marketed cannabinoid per serving; Location where the Hemp was Grown (Growing Region); State or country of origin of Product if not from the United States; Name of the Independent, Accredited Laboratory used by the Manufacturer to Test the Product; and Address of Testing Laboratory.

At act 26, the subscriber adds ingredients and inputs ingredient info into the system. Again, states and territories may require different ingredient information based on the respective laws and regulations in the states and territories. The system will provide the required ingredient data fields dependent on the states and territories the subscriber picked at act 14. Possible ingredient data fields may include, but are not limited to: Ingredient Name; Name of the Company that Manufactured the Ingredient; Company or Product Identification Number or Code (if applicable); Ingredient Lot Number; and Growing region(s) for hemp-derived ingredients.

At act 30, the subscriber may upload a COA from an independent lab. States and territories may require different tests and information on a COA based on the respective laws and regulations in the states and territories. The system will provide titles and/or descriptions with checkable boxes for the requirements of the selected states and/or territories to give the subscriber the opportunity to verify that the required testing and/or information was done or is on the COA. If the required testing or information is shown on the COA, the subscriber will check the associated box. The required testing and information on the COA are dependent on the states and territories the subscriber picked at act 14. Possible testing and information (with checkable boxes) may include, but are not limited to: Picture of the Product Tested; Batch Identification ("ID") Number; Date Received by Lab for Testing; Date of Completion of Testing; Method of Analysis for Each Test Conducted; Measurement of Uncertainty Analysis Parameters; The Hemp Extract is the Product of a Batch Tested by the Independent Testing Laboratory; Compliance with Federal THC Limit (<0.3% Δ-9 THC); Concentration of Cannabinoids (THC, CBD, CBG, CBN, etc.) (cannabinoid profile by percentage of dry weight); Amount of Cannabinoids (THC, CBD, CBG, CBN, etc.) by Dry Weight in Milligrams; Amount of THC by Dry Weight in Milligrams; Total delta-9-THC ("total available tetrahydrocannabinol measured as the sum of delta-9-tetrahydrocannabinol and 87.7% of the delta-9-tetrahydrocannabinol acid reported on a dry weight basis"); Amount of CBD by Dry Weight in Milligrams; Amount of Pesticide Residues in the Product in Parts per Million; Residual Pesticides (reported in unit micrograms per gram (µg/g), and indicate "pass" or "fail" per "action levels" specified in California Bureau of Cannabis Control regulations); Presence or Quantity of Pesticides ("Acceptable Limit" specified in Texas DSHS regulations); Amount of Heavy Metal Traces in the Product in Parts per Million; Heavy Metals Testing (reported in unit micrograms per gram (µg/g), and indicate "pass" or "fail" per "action levels" specified in California Bureau of Cannabis Control regulations); Presence or Quantity of Heavy Metals ("Acceptable Limit" specified in Texas DSHS regulations); Amount of Mycotoxin Contaminants; Mycotoxins Testing (reported in unit micrograms per kilograms (µg/kg), and indicate "pass" or "fail" per levels specified in California Bureau of Cannabis Control regulations); Amount of Microbiological Contaminants in the Product in Colony-Forming Units (CFU) per Gram; Microbiological Impurities (indicate "pass" or "fail" for microbiological impurities specified in California Bureau of Cannabis Control regulations); Presence or Quantity of Harmful Pathogens (Microbiological Contaminants) (e.g., molds, yeasts, *Listeria monocytogenes, Campylobacter, Salmonella, E. coli, Yersinia, Staphylococcus*, Shiga-Toxin) ("Acceptable Limit" specified in Texas DSHS regulations); Amount of Residual Solvents in the Product in Parts per Million; Residual Solvents and Processing Chemicals (reported in unit micrograms per gram (µg/g), and indicate "pass" or "fail" per "action levels" specified in California Bureau of Cannabis Control regulations); Foreign Material (including, but not limited to, hair, insects, or similar or related adulterant) (indicate "pass" or "fail" per standards specified in California Bureau of Cannabis Control regulations); Terpenes, if applicable (reported as specified in California Bureau of Cannabis Control regulations); No Synthetic Cannabinoids; and No Contaminants Unsafe for Human Consumption.

At act 34 the system generates a QR code. The generated QR code may be a dynamic QR code. The generated QR code also may be a static QR code. At act 38, the system also generates a product page. The product page is an internet webpage for the product the subscriber began adding with act 10. The product page may include the product information, batch information, ingredients and ingredients information, and the COA inputted by the subscriber at acts 18, 22, 26, and 30. The product page therefore may comply with all the laws and regulations of the states selected by the subscriber at act 14.

If the generated QR code is static, the QR code will directly link to the system-generated product page. If the generated QR code is dynamic, the QR code will link to a URL for which the system has the ability to redirect traffic, meaning that the system will allow the subscriber to choose whether the QR code will link to the product page created by the system at act 38, or a different product page of the subscriber's choosing. Therefore, if the generated QR code is dynamic, at act 42 the subscriber has the option to have the QR code link to the product page created by the system at act 38, or the subscriber can instruct the system to link the QR code to a different product page of the subscriber's choosing. This different product page may be another internet webpage that the subscriber created, or had created. An advantage of this system, is that the subscriber may use the system-generated product page as a template to make sure that the different product page of subscriber's choosing complies with all the required laws and regulations of the states and territories selected by the subscriber at act 14.

If the generated QR code is dynamic, at act 46, the system will redirect traffic from the URL address encoded in the QR code. The URL address to which the system redirects traffic may be the URL address for the product page generated by the system at act 38, or a different URL address specified by the subscriber in act 42, which may be the URL address for a different product page created by the subscriber.

In addition to the advantages provided by the use of dynamic QR codes, allowing for a redirect of traffic, the system may also use short URLs to reduce the amount of data required to be encoded into the QR code. By reducing the amount of data encoded in the QR code, the system is able to optimize the size and error correction level of the QR code. In a preferred embodiment, the QR code compliance method and system uses QR Code Version 3 (29×29 modules), and error correction Level H (High) (30% of data bytes can be restored).

At act 50, the system provides a preview of the product page generated by the system, and the subscriber can either publish the product page (make it available for viewing on the internet) or keep it as a draft version, where it remains private and not publically viewable. At act 54 the system provides a downloadable QR code in various file formats such as PNG, JPG, SVG, and EPS, which the subscriber can download and use in labels for the subscriber's products. The subscriber can also use the QR code in marketing materials, and other materials associated with the subscriber's products At act 58, the subscriber can go back to the previous steps to edit the information submitted by subscriber.

Figure 2:
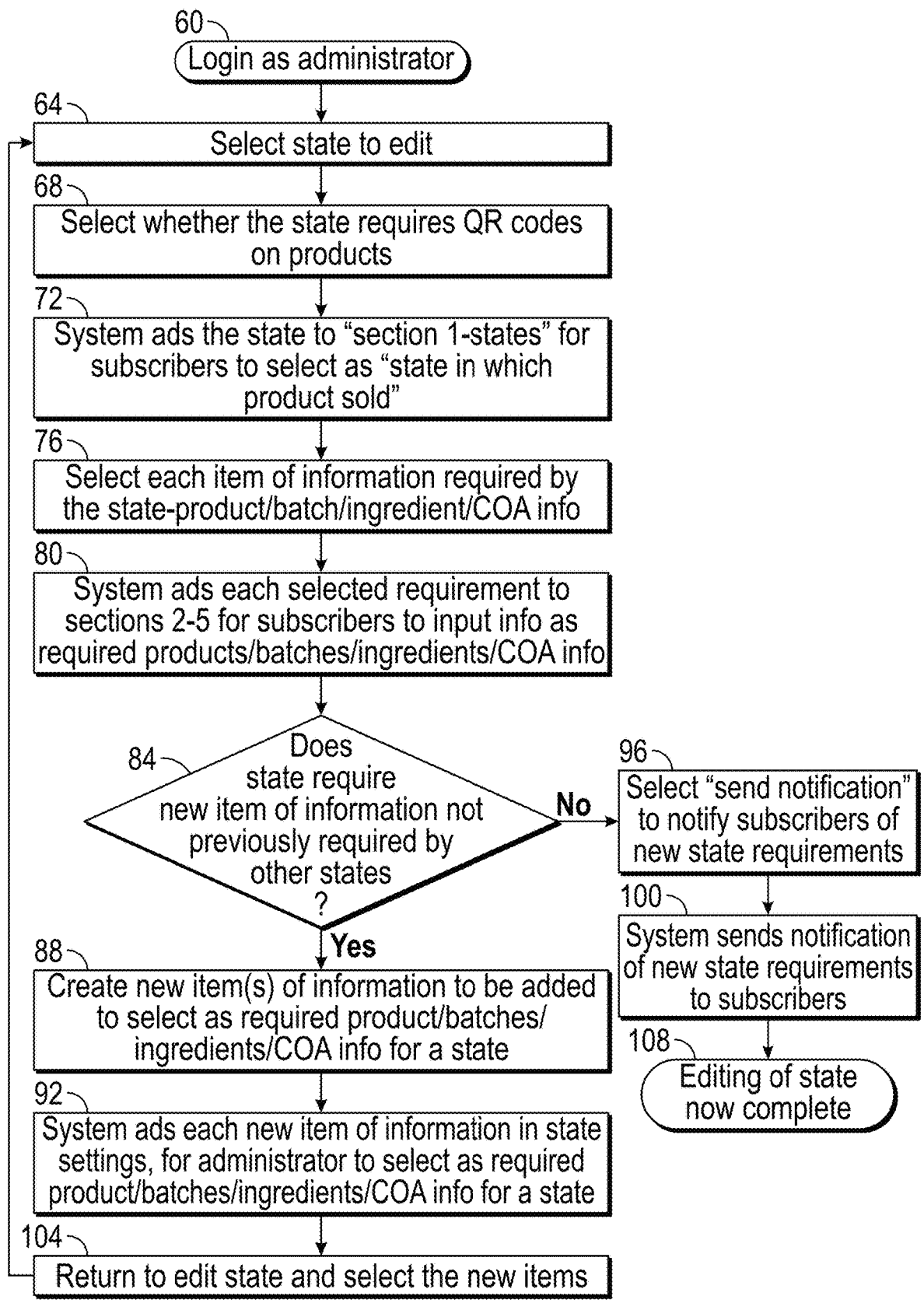
FIG. 2 is a flowchart showing another embodiment of the method of the system.

FIG. 2 is a flowchart showing one embodiment of the method of the system. In this figure, the steps of the back end/administrator end is shown. At act 60, the administrator logs into the system as an administrator. At act 64, the administrator may select a state to edit or add. If the state is already in the system, then the administrator will be able to edit that state. If the state is not in the system yet, the administrator may add the state at this act. In either case, if the state is added or if a state is already in the system, the state will be considered "selected" at this step. At act 68 the administrator can input into the system whether the selected state requires QR codes on products. The administrator may specify whether the state requires QR codes by law, having already passed laws or regulations requiring QR codes on products, or if the selected state simply has pending legislation and/or rulemaking that may require QR codes on products if/when passed into law. At act 72, the system will add the selected state, if the state is a state newly added to the system, to the list of states for subscribers to select at act 14 in FIG. 1. Subscribers will now see an added state in the list of states in which QR codes are required by law, or in the list of states with pending legislation.

At act 76, for newly added states, or states that have revised their requirements, the administrator selects each item of information required by the state (or to be required by the state if/when pending legislation is passed into law). Such information may include product information, batch information, ingredient information, and COA requirements. For information and COA requirements that correspond with those already required by other states, or previously found in pending legislation, the item will have already been entered in the system, so that at act 76 the administrator is selecting the item(s) from an existing list of information and COA requirements.

At act 80, the system will add/include the items of information and testing requirements for the selected state, for the subscribers to input Product, Batch, and Ingredient information in acts 18, 22, and 26, and to select testing requirements for an uploaded COA in act 30, as shown in FIG. 1. Subscribers will now see any added/included items of information and testing requirements when the added/revised state is selected by the subscriber as a state in which product is sold.

If each of the added items of information and testing requirements for the added/revised state is limited to information and COA requirements that correspond with those already required by other states, or previously found in pending legislation, the item will have already been entered in the system, so that at act 76 the administrator selected the item(s) from an existing list of information and COA requirements. On the other hand, if any of the added items of information and testing requirements for the added/revised state is not limited to information and COA requirements that correspond with those already required by other states, or previously found in pending legislation, the item will not have already been entered in the system. In that case, at act 76 the administrator was not able to select the item(s) from the existing list of information and COA requirements. In that case, at act 84, the administrator will continue to act 88, in which the administrator will create a new item (or items) of information to be added, such as new data fields, titles and descriptions, for the product information, batch information, and ingredient information, and/or new titles and/or descriptions with checkable boxes for new requirements for testing and information with respect to the COA. Then at act 92, the system adds the new item of information from act 88 such that a subscriber will see the new item of information, if the subscriber chooses the selected state, at one of the acts 18, 22, 26, and/or 30 from FIG. 1.

At act 104, the administrator returns to act 64 to select the state for which new items of information and/or COA requirements were created in act 88, and at act 76 selects each of those new items of information and/or COA requirements. At this point the Administrator should reach act 84 with any and all new items of information and COA requirements now having been entered in the system, so that at act 76 the administrator was able to select all required items from an existing list of information and COA requirements. In other words, there is no need to create in the system an additional item of new information or COA requirement.

This confirms that the adding/editing of a state is now complete, and ready to move to act 96 for notifications to subscribers. At act 96, the administrator can choose to have the system "send notification", that is notify subscribers of a newly added state, and/or a newly added required item of information. At act 100, the system then sends notification of the new state requirements to subscribers, including those who have previously selected a now edited state, and to all subscribers to notify them of the addition of a new state. Notification may be an alert when the subscriber logs onto the software system, an email sent to the subscriber, a text message sent to the subscriber, a voice message to the subscriber, and/or a notice sent through the mail or delivery service. The editing/adding of a state, and subscriber notifications is now complete as shown at terminator 108.

Figure 3:
FIG. 3 is a screenshot of one embodiment of the disclosed system.

FIG. 3 is a screenshot of one embodiment of the disclosed system. FIG. 3 shows a screenshot of the selection of states screen for a subscriber. Currently, only California, Florida, Indiana, Kentucky, Louisiana, Minnesota, New York, Texas and Utah have laws or regulations enacted requiring QR codes on hemp products. Iowa, Michigan, New Hampshire, and South Carolina have (or have had) pending legislation that may require QR codes on hemp products if/when passed into law. A subscriber has the option to select one or more states, or the subscriber can select all states by checking the "select all" box. As other states pass laws or regulations, an administrator will be able to add new states, as described with respect to FIG. 2.

Figure 4:
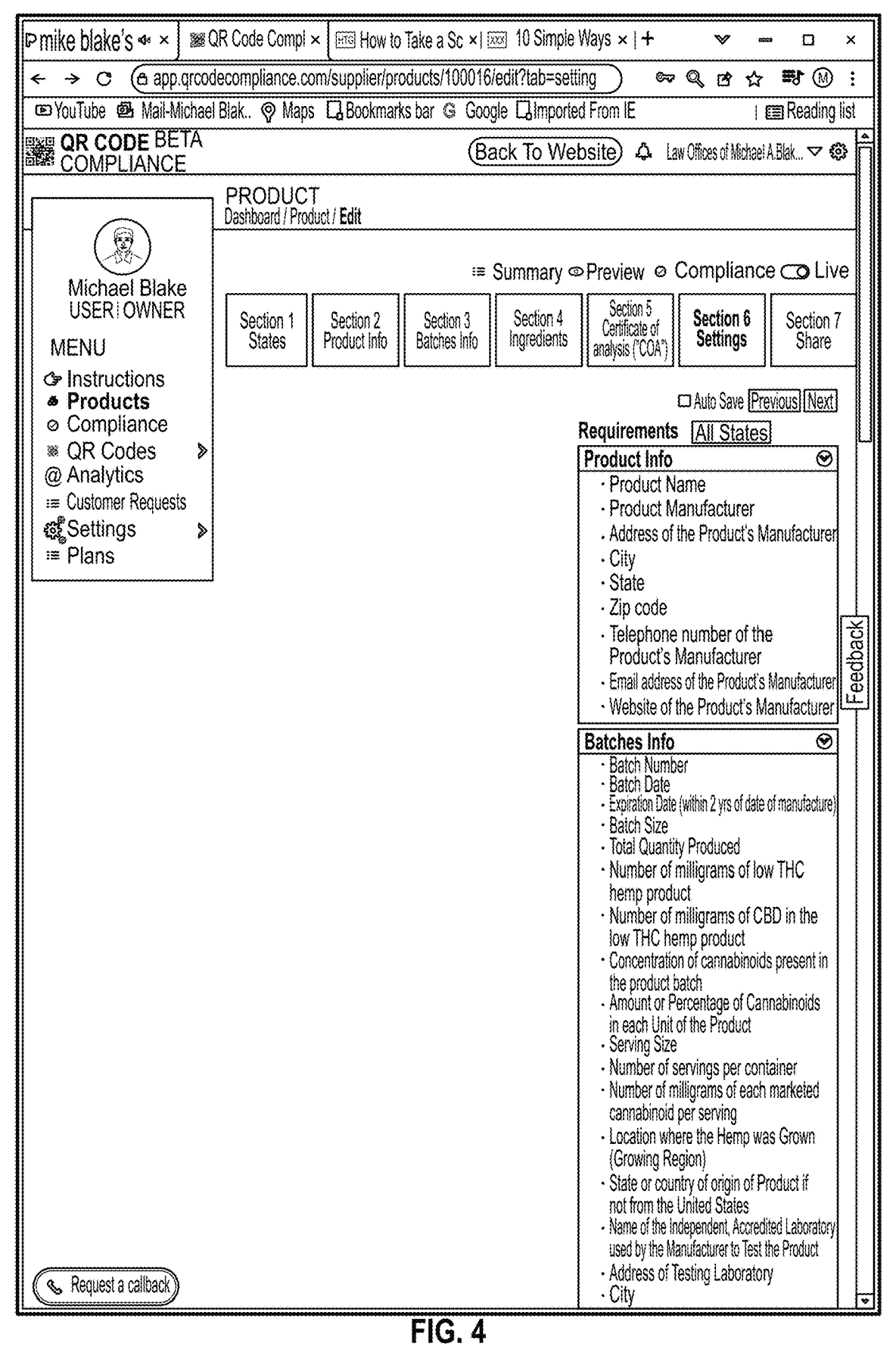
Figure 5:
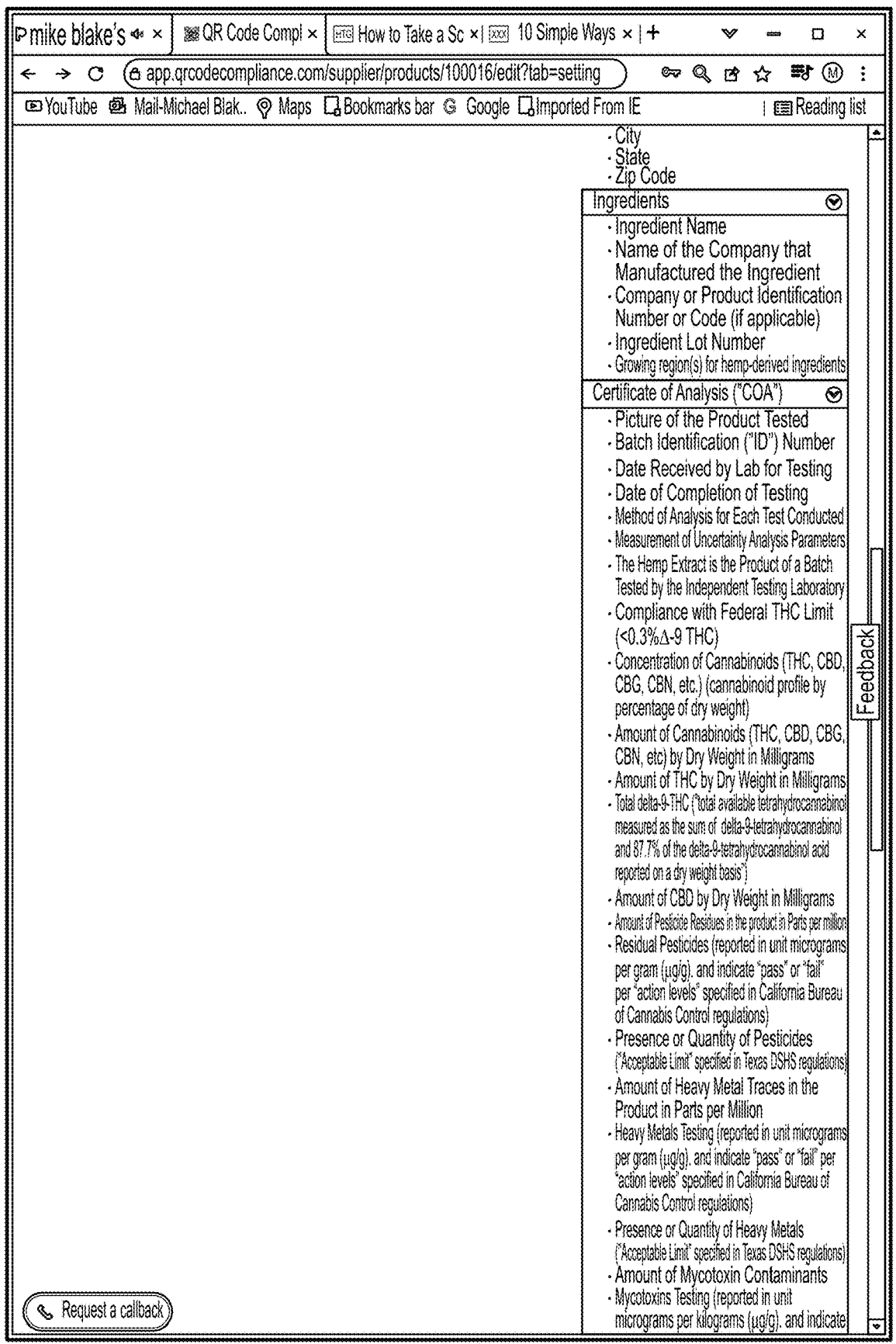
FIG. 5 is a screenshot showing the middle of the page from FIG. 4.
Figure 6:
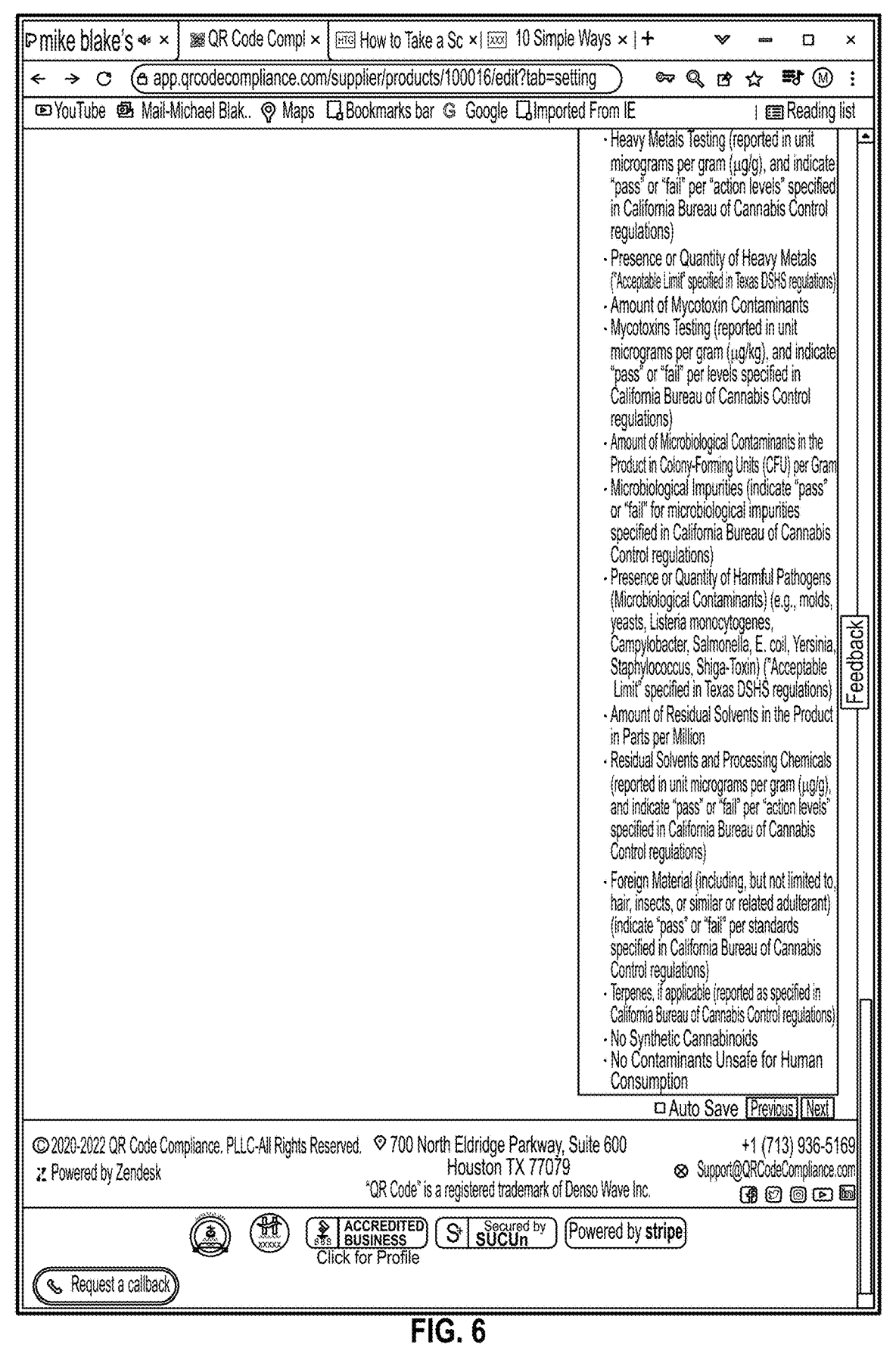

FIG. 4 is a screenshot of a top one page of one embodiment of the disclosed system showing the various requirements of information and testing as required by states with current or pending laws and regulations regarding QR codes on hemp products. The screen shot continues on FIG. 5, which shows the middle of the page of one embodiment of the disclosed system. The screen shot continues to FIG. 6, which shows the bottom of the page of one embodiment of the disclosed system. The requirements may be divided into the following categories: Product Info; Batches Info; Ingredients, and COA. Required information under Product info may include, but is not limited to: Product Name; Product Manufacturer; Address of the Product's Manufacturer; Telephone number of the Product's Manufacturer; Email address of the Product's Manufacturer; Website of the Product's Manufacturer. Other information, not shown, which may be desirable for a subscriber to include in the Product info, even if not required by law, may include: UPC number for product; SKU for the product; and an image of the product.

Required information under Batches Info may include, but is not limited to: Batch Number; Batch Date; Expiration Date (within 2 yrs of date of manufacture); Batch Size; Total Quantity Produced; Number of milligrams of low THC hemp product; Number of milligrams of CBD in the low THC hemp product; Concentration of cannabinoids present in the product batch; Amount or Percentage of Cannabinoids in each Unit of the Product; Serving size; Number of servings per container; Number of milligrams of each marketed cannabinoid per serving; Location where the Hemp was Grown (Growing Region); State or country of origin of Product if not from the United States; Name of the Independent, Accredited Laboratory used by the Manufacturer to Test the Product; and Address of Testing Laboratory.

Required information under Ingredients may include, but is not limited to: Ingredient Name; Name of the Company that Manufactured the Ingredient; Company or Product Identification Number or Code (if applicable); Ingredient Lot Number; and Growing region(s) for hemp-derived ingredients.

Required testing and information under COA may include, but is not limited to: Picture of the Product Tested; Batch Identification ("ID") Number; Date Received by Lab for Testing; Date of Completion of Testing; Method of Analysis for Each Test Conducted; Measurement of Uncertainty Analysis Parameters; The Hemp Extract is the Product of a Batch Tested by the Independent Testing Laboratory; Compliance with Federal THC Limit (<0.3% Δ-9 THC); Concentration of Cannabinoids (THC, CBD, CBG, CBN, etc.) (cannabinoid profile by percentage of dry weight); Amount of Cannabinoids (THC, CBD, CBG, CBN, etc.) by Dry Weight in Milligrams; Amount of THC by Dry Weight in Milligrams; Total delta-9-THC ("total available tetrahydrocannabinol measured as the sum of delta-9-tetrahydrocannabinol and 87.7% of the delta-9-tetrahydrocannabinol acid reported on a dry weight basis"); Amount of CBD by Dry Weight in Milligrams; Amount of Pesticide Residues in the Product in Parts per Million; Residual Pesticides (reported in unit micrograms per gram (μg/g), and indicate "pass" or "fail" per "action levels" specified in California Bureau of Cannabis Control regulations); Presence or Quantity of Pesticides ("Acceptable Limit" specified in Texas DSHS regulations); Amount of Heavy Metal Traces in the Product in Parts per Million; Heavy Metals Testing (reported in unit micrograms per gram (μg/g), and indicate "pass" or "fail" per "action levels" specified in California Bureau of Cannabis Control regulations); Presence or Quantity of Heavy Metals ("Acceptable Limit" specified in Texas DSHS regulations); Amount of Mycotoxin Contaminants; Mycotoxins Testing (reported in unit micrograms per kilograms (μg/kg), and indicate "pass" or "fail" per levels specified in California Bureau of Cannabis Control regulations); Amount of Microbiological Contaminants in the Product in Colony-Forming Units (CFU) per Gram; Microbiological Impurities (indicate "pass" or "fail" for microbiological impurities specified in California Bureau of Cannabis Control regulations); Presence or Quantity of Harmful Pathogens (Microbiological Contaminants) (e.g., molds, yeasts, *Listeria monocytogenes, Campylobacter, Salmonella, E. coli, Yersinia, Staphylococcus*, Shiga-Toxin) ("Acceptable Limit" specified in Texas DSHS regulations); Amount of Residual Solvents in the Product in Parts per Million; Residual Solvents and Processing Chemicals (reported in unit micrograms per gram (μg/g), and indicate "pass" or "fail" per "action levels" specified in California Bureau of Cannabis Control regulations); Foreign Material (including, but not limited to, hair, insects, or similar or related adulterant) (indicate "pass" or "fail" per standards specified in California Bureau of Cannabis Control regulations); Terpenes, if applicable (reported as specified in California Bureau of Cannabis Control regulations); No Synthetic Cannabinoids; and No Contaminants Unsafe for Human Consumption.

Throughout this patent application, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium. For example, a server can include one or more computers operating as a web server, database server, or other type of computer server in a manner to fulfill described roles, responsibilities, or functions. Within the context of this document, the disclosed smart phones, tablets, or hand held computers are also deemed to comprise computing devices having a processor and a non-transitory memory storing instructions executable by the processor that cause the device to control, manage, or otherwise manipulate the features of the disclosed apparatuses, systems and methods.

The QR code compliance method and system has many advantages. The QR code compliance method and system provides an effective technical solution to the technical problem of complying with the various laws and regulations requiring QR codes on product labels, including numerous and often-changing requirements for the product information that must be provided to consumers through the QR codes, along with the numerous and often-changing requirements for testing of the products. The QR code compliance method and system also provides an effective technical solution to the technical problem of maintaining compliance as the various laws and regulations requiring QR codes on product labels frequently changes over time, by notifying subscribers of new requirements passed by states, including notifications via email, text, flag on website, or physical mail. A subscriber is able to upload data and information to the QR code compliance system, and the QR code compliance system generates a dynamic QR code and links the QR code to either a system-generated internet product page that is compliant with the laws of all selected states, or an internet product page created by the subscriber. The subscriber can use the system-generated internet product page to verify the subscriber's non-system-generated internet product page complies with all selected states requirements. The QR code compliance method and system provides an effective technical solution to allow subscribers, including manufacturers and retailers of products, to get into compliance with laws and regulations requiring QR codes on products, and provides an effective technical solution to allow subscribers to stay in compliance as the laws and regulations change over time. The QR code compliance method and system provides an effective technical solution to the technical problems of an administrator needing to update/edit such a system as the laws and regulations requiring QR codes on products change over time.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. As an example, for the order of the acts set forth in the FIG. 2 flowchart showing steps of the back end/administrator end, one could choose to modify the order of the steps to accomplish the same result. In the steps shown in FIG. 2, the administrator first selects requirements from those on the existing list of requirements in act 76, later creates any new requirements in act 88, then returns to act 76 to select the newly created requirement. An administrator could instead start with act 88 to create any new requirements, then proceed to act 76 with the ability to select from the list all requirements on a first and only performance of act 76, thereby accomplishing the same result.

Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A software system comprising a non-transitory computer-readable medium, wherein the medium includes a set of instructions stored thereon that when accessed by a processor enable the processor to perform a method of creating an internet product page, the method comprising:
    adding a product to be a subject of an internet product page in response to a subscriber input;
    querying the subscriber for information;
    creating the internet product page based on a template that complies with laws and/or regulations of a state with respect to the product, and displaying an internet product page information, based on the subscriber queries, that complies with laws and/or regulations of the state with respect to the product;
    generating a QR code;
    downloading the QR code to the subscriber;
    querying the subscriber whether to link the QR code to the generated internet product page or link the QR code to another internet product page,
    publishing the subscriber selected internet product page,
    previewing the subscriber selected internet product page;
    querying the subscriber if the subscriber selected internet product page will be published or will be kept private, and
    publishing subscriber selected internet product page if the subscriber elected to publish.

2. The software system of claim 1, wherein the method further comprises:
    querying the subscriber as to which state or states the product will be sold in.

3. The software system of claim 2, wherein the method further comprises:
    querying the subscriber for product information.

4. The software system of claim 3, wherein the querying the subscriber for product information act includes querying the subscriber for one or more of Product Name, Product Manufacturer, Address of the Product's Manufacturer, Telephone number of the Product's Manufacturer, Email address of the Product's Manufacturer, Website of the Product's Manufacturer, UPC number for product, SKU for the product, and an image of the product.

5. The software system of claim 2, wherein the method further comprises:
    querying the subscriber for batch information.

6. The software system of claim 5, wherein the querying the subscriber for batch information act includes querying the subscriber for one or more of Batch Number, Batch Date, Expiration Date (within 2 yrs of date of manufacture), Batch Size, Total Quantity Produced, Number of milligrams of low THC hemp product, Number of milligrams of CBD in the low THC hemp product, Concentration of cannabinoids present in the product batch, Amount or Percentage of Cannabinoids in each Unit of the Product, Serving size, Number of servings per container, Number of milligrams of each marketed cannabinoid per serving, Location where the Hemp was Grown (Growing Region), State or country of origin of Product if not from the United States, Name of the Independent, Accredited Laboratory used by the Manufacturer to Test the Product, and Address of Testing Laboratory.

7. The software system of claim 2, wherein the method further comprises:
querying the subscriber for ingredients and ingredients information.

8. The software system of claim 7, wherein the querying the subscriber for ingredients and ingredients information act includes querying the subscriber for one or more of Ingredient Name, Name of the Company that Manufactured the Ingredient, Company or Product Identification Number or Code (if applicable), Ingredient Lot Number, and Growing region(s) for hemp-derived ingredients.

9. The software system of claim 2, wherein the method further comprises:
querying the subscriber for a certificate of analysis.

10. The software system of claim 9, wherein the querying the subscriber for certificate of analysis act includes querying the subscriber for one or more of Picture of the Product Tested, Batch Identification ("ID") Number, Date Received by Lab for Testing, Date of Completion of Testing, Method of Analysis for Each Test Conducted, Measurement of Uncertainty Analysis Parameters, The Hemp Extract is the Product of a Batch Tested by the Independent Testing Laboratory, Compliance with Federal THC Limit (<0.3% Δ-9 THC), Concentration of Cannabinoids (THC, CBD, CBG, CBN, etc.) (cannabinoid profile by percentage of dry weight), Amount of Cannabinoids (THC, CBD, CBG, CBN, etc.) by Dry Weight in Milligrams, Amount of THC by Dry Weight in Milligrams, Total delta-9-THC ("total available tetrahydrocannabinol measured as the sum of delta-9-tetrahydrocannabinol and 87.7% of the delta-9-tetrahydrocannabinol acid reported on a dry weight basis"), Amount of CBD by Dry Weight in Milligrams, Amount of Pesticide Residues in the Product in Parts per Million, Residual Pesticides (reported in unit micrograms per gram (μg/g), and indicate "pass" or "fail" per "action levels" specified in California Bureau of Cannabis Control regulations), Presence or Quantity of Pesticides ("Acceptable Limit" specified in Texas DSHS regulations), Amount of Heavy Metal Traces in the Product in Parts per Million, Heavy Metals Testing (reported in unit micrograms per gram (μg/g), and indicate "pass" or "fail" per "action levels" specified in California Bureau of Cannabis Control regulations), Presence or Quantity of Heavy Metals ("Acceptable Limit" specified in Texas DSHS regulations), Amount of Mycotoxin Contaminants, Mycotoxins Testing (reported in unit micrograms per kilograms (μg/kg), and indicate "pass" or "fail" per levels specified in California Bureau of Cannabis Control regulations), Amount of Microbiological Contaminants in the Product in Colony-Forming Units (CFU) per Gram, Microbiological Impurities (indicate "pass" or "fail" for microbiological impurities specified in California Bureau of Cannabis Control regulations), Presence or Quantity of Harmful Pathogens (Microbiological Contaminants) (e.g., molds, yeasts, *Listeria monocytogenes, Campylobacter, Salmonella, E. coli, Yersinia, Staphylococcus*, Shiga-Toxin) ("Acceptable Limit" specified in Texas DSHS regulations), Amount of Residual Solvents in the Product in Parts per Million, Residual Solvents and Processing Chemicals (reported in unit micrograms per gram (μg/g), and indicate "pass" or "fail" per "action levels" specified in California Bureau of Cannabis Control regulations), Foreign Material (including, but not limited to, hair, insects, or similar or related adulterant) (indicate "pass" or "fail" per standards specified in California Bureau of Cannabis Control regulations), Terpenes, if applicable (reported as specified in California Bureau of Cannabis Control regulations), No Synthetic Cannabinoids, and No Contaminants Unsafe for Human Consumption.

11. The software system of claim 2, wherein the generated internet product page is substantially compliant with the laws of the selected state or states.

12. The software system of claim 1, wherein the method further comprises:
redirecting traffic from URL address encoded in QR code to the internet product page selected by the subscriber.

13. The software system of claim 1, wherein the QR code is a static QR code.

14. The software system of claim 1, wherein the QR code is a dynamic QR code.

15. The software system of claim 1, wherein the method further comprises:
alerting subscribers of new requirements for substantially compliant internet product pages.

16. The software system of claim 1, wherein the product is a consumable hemp product.

17. A software system comprising a non-transitory computer-readable medium, wherein the medium includes a set of instructions stored thereon that when accessed by a processor enable the processor to perform a method of creating an internet product page and for alerting subscribers of new requirements for a one or more internet product pages, the method comprising:
adding a product to be a subject of an internet product page in response to a subscriber input;
querying the subscriber as to which a one or more states the product will be sold in;
querying the subscriber for product information;
querying the subscriber for batch information;
querying the subscriber for ingredients and ingredients information;
querying the subscriber for certificate of analysis;
generating a QR code;
creating the internet product page based on a template that substantially complies with laws and/or regulations of the state with respect to the product, displaying information, based on the subscriber queries, that substantially complies with laws and/or regulations of the state with respect to the product;
querying the subscriber whether to link the QR code to the internet product page or link the QR code to another internet product page;
redirecting traffic from URL address encoded in QR code to the internet product page selected by the subscriber;
providing to the subscriber a preview of the internet product page selected by the subscriber;
querying the subscriber if the internet product page will be published or will be kept private;
publishing the internet product page if the subscriber elected to publish; and
downloading the QR code to the subscriber.

18. The software system of claim 17, wherein the querying the subscriber for product information act includes querying the subscriber for one or more of Product Name, Product Manufacturer, Address of the Product's Manufacturer, Telephone number of the Product's Manufacturer, Email address of the Product's Manufacturer, Website of the Product's Manufacturer, UPC number for product, SKU for the product, and an image of the product.

19. The software system of claim 17, wherein the querying the subscriber for batch information act includes querying the subscriber for one or more of Batch Number, Batch Date, Expiration Date (within 2 yrs of date of manufacture), Batch Size, Total Quantity Produced, Number of milligrams of low THC hemp product, Number of milligrams of CBD in the low THC hemp product, Concentration of cannabinoids present in the product batch, Amount or Percentage of Cannabinoids in each Unit of the Product, Serving size, Number of servings per container, Number of milligrams of each marketed cannabinoid per serving, Location where the Hemp was Grown (Growing Region), State or country of origin of Product if not from the United States, Name of the Independent, Accredited Laboratory used by the Manufacturer to Test the Product, and Address of Testing Laboratory.

20. The software system of claim 17, wherein the querying the subscriber for ingredients and ingredients information act includes querying the subscriber for one or more of Ingredient Name, Name of the Company that Manufactured the Ingredient, Company or Product Identification Number or Code (if applicable), Ingredient Lot Number, and Growing region(s) for hemp-derived ingredients.

21. The software system of claim 17, wherein the querying the subscriber for certificate of analysis act includes querying the subscriber for one or more of Picture of the Product Tested, Batch Identification ("ID") Number, Date Received by Lab for Testing, Date of Completion of Testing, Method of Analysis for Each Test Conducted, Measurement of Uncertainty Analysis Parameters, The Hemp Extract is the Product of a Batch Tested by the Independent Testing Laboratory, Compliance with Federal THC Limit (<0.3% Δ-9 THC), Concentration of Cannabinoids (THC, CBD, CBG, CBN, etc.) (cannabinoid profile by percentage of dry weight), Amount of Cannabinoids (THC, CBD, CBG, CBN, etc.) by Dry Weight in Milligrams, Amount of THC by Dry Weight in Milligrams, Total delta-9-THC ("total available tetrahydrocannabinol measured as the sum of delta-9-tetrahydrocannabinol and 87.7% of the delta-9-tetrahydrocannabinol acid reported on a dry weight basis"), Amount of CBD by Dry Weight in Milligrams, Amount of Pesticide Residues in the Product in Parts per Million, Residual Pesticides (reported in unit micrograms per gram (µg/g), and indicate "pass" or "fail" per "action levels" specified in California Bureau of Cannabis Control regulations), Presence or Quantity of Pesticides ("Acceptable Limit" specified in Texas DSHS regulations), Amount of Heavy Metal Traces in the Product in Parts per Million, Heavy Metals Testing (reported in unit micrograms per gram (µg/g), and indicate "pass" or "fail" per "action levels" specified in California Bureau of Cannabis Control regulations), Presence or Quantity of Heavy Metals ("Acceptable Limit" specified in Texas DSHS regulations), Amount of Mycotoxin Contaminants, Mycotoxins Testing (reported in unit micrograms per kilograms (µg/kg), and indicate "pass" or "fail" per levels specified in California Bureau of Cannabis Control regulations), Amount of Microbiological Contaminants in the Product in Colony-Forming Units (CFU) per Gram, Microbiological Impurities (indicate "pass" or "fail" for microbiological impurities specified in California Bureau of Cannabis Control regulations), Presence or Quantity of Harmful Pathogens (Microbiological Contaminants) (e.g., molds, yeasts, *Listeria monocytogenes, Campylobacter, Salmonella, E. coli, Yersinia, Staphylococcus*, Shiga-Toxin) ("Acceptable Limit" specified in Texas DSHS regulations), Amount of Residual Solvents in the Product in Parts per Million, Residual Solvents and Processing Chemicals (reported in unit micrograms per gram (µg/g), and indicate "pass" or "fail" per "action levels" specified in California Bureau of Cannabis Control regulations), Foreign Material (including, but not limited to, hair, insects, or similar or related adulterant) (indicate "pass" or "fail" per standards specified in California Bureau of Cannabis Control regulations), Terpenes, if applicable (reported as specified in California Bureau of Cannabis Control regulations), No Synthetic Cannabinoids, and No Contaminants Unsafe for Human Consumption.

22. A software system comprising a non-transitory computer-readable medium, wherein the medium includes a set of instructions stored thereon that when accessed by a processor enable the processor to perform a method of creating an internet product page and for alerting subscribers of new requirements for a one or more internet product pages, the method comprising:

querying an administrator to select a new state to add or select a previously entered state to edit;

querying the administrator whether the state requires QR codes on a one or more products;

adding the new state to a list of states for subscribers to select from, if the new state is being added;

querying the administrator for each of an item of information required by the selected state;

adding each of the item of information to a template that substantially complies with law and/or regulations of the state with respect to the product required by the selected state as data fields, titles and descriptions, for product information, batch information, and ingredient information, and/or adding titles and/or descriptions with checkable boxes for tests and information required on a certificate of analysis required by the selected state;

querying the administrator whether the selected state requires a new item of information not previously required by the other previously entered states;

querying the administrator for a new item of information required from subscribers;

adding the new item of information such that a subscriber will see the new item of information if the subscriber chooses the selected state as a state subscriber's product will be sold in;

querying the administrator whether to send a notification to subscribers who had previously selected the selected state as a state the product will be sold in; and sending the notification to the subscriber if the administrator elects to send the notification.

23. The software system of claim 22, wherein the querying the administrator for each item of information required by the selected state includes querying the administrator whether one or more of the following information should be added for the selected state: Product Name, Product Manufacturer, Address of the Product's Manufacturer, Telephone number of the Product's Manufacturer, Email address of the Product's Manufacturer, Website of the Product's Manufacturer, UPC number for product, SKU for the product, an image of the product; Batch Number, Batch Date, Expiration Date (within 2 yrs of date of manufacture), Batch Size, Total Quantity Produced, Number of milligrams of low THC hemp product, Number of milligrams of CBD in the low THC hemp product, Concentration of cannabinoids present in the product batch, Amount or Percentage of Cannabinoids in each Unit of the Product, Serving size, Number of servings per container, Number of milligrams of each marketed cannabinoid per serving, Location where the Hemp was Grown (Growing Region), State or country of origin of Product if not from the United States, Name of the Independent, Accredited Laboratory used by the Manufacturer to Test the Product, Address of Testing Laboratory; Ingredient Name, Name of the Company that Manufactured the Ingredient, Company or Product Identification Number or Code (if applicable), Ingredient Lot Number, Growing region(s) for hemp-derived ingredients; Picture of the Product Tested, Batch Identification ("ID") Number, Date Received by Lab for Testing, Date of Completion of Testing, Method of Analysis for Each Test Conducted, Measurement of Uncertainty Analysis Parameters, The Hemp Extract is the Product of a Batch Tested by the Independent Testing Laboratory, Compliance with Federal THC Limit (<0.3%Δ-9 THC), Concentration of Cannabinoids (THC, CBD, CBG, CBN, etc.) (cannabinoid profile by percentage of dry weight), Amount of Cannabinoids (THC, CBD, CBG, CBN, etc.) by Dry Weight in Milligrams, Amount of THC by Dry Weight in Milligrams, Total delta-9-THC ("total available tetrahydrocannabinol measured as the sum of delta-9-tetrahydrocannabinol and 87.7% of the delta-9-tetrahydrocannabinol acid reported on a dry weight basis"), Amount of CBD by Dry Weight in Milligrams, Amount of Pesticide Residues in the Product in Parts per Million, Residual Pesticides (reported in unit micrograms per gram (μg/g), and indicate "pass" or "fail" per "action levels" specified in California Bureau of Cannabis Control regulations), Presence or Quantity of Pesticides ("Acceptable Limit" specified in Texas DSHS regulations), Amount of Heavy Metal Traces in the Product in Parts per Million, Heavy Metals Testing (reported in unit micrograms per gram (μg/g), and indicate "pass" or "fail" per "action levels" specified in California Bureau of Cannabis Control regulations), Presence or Quantity of Heavy Metals ("Acceptable Limit" specified in Texas DSHS regulations), Amount of Mycotoxin Contaminants, Mycotoxins Testing (reported in unit micrograms per kilograms (μg/kg), and indicate "pass" or "fail" per levels specified in California Bureau of Cannabis Control regulations), Amount of Microbiological Contaminants in the Product in Colony-Forming Units (CFU) per Gram, Microbiological Impurities (indicate "pass" or "fail" for microbiological impurities specified in California Bureau of Cannabis Control regulations), Presence or Quantity of Harmful Pathogens (Microbiological Contaminants) (e.g., molds, yeasts, *Listeria monocytogenes, Campylobacter, Salmonella, E. coli, Yersinia, Staphylococcus*, Shiga-Toxin) ("Acceptable Limit" specified in Texas DSHS regulations), Amount of Residual Solvents in the Product in Parts per Million, Residual Solvents and Processing Chemicals (reported in unit micrograms per gram (μg/g), and indicate "pass" or "fail" per "action levels" specified in California Bureau of Cannabis Control regulations), Foreign Material (including, but not limited to, hair, insects, or similar or related adulterant) (indicate "pass" or "fail" per standards specified in California Bureau of Cannabis Control regulations), Terpenes, if applicable (reported as specified in California Bureau of Cannabis Control regulations), No Synthetic Cannabinoids, and No Contaminants Unsafe for Human Consumption.

24. The software system of claim 22, wherein the sending notification act includes one or more of the following types of notification: an alert when the subscriber logs onto the software system, an email sent to the subscriber, a text message sent to the subscriber, a voice message to the subscriber, and a notice sent through the mail or delivery service.

25. A software system comprising a non-transitory computer-readable medium, wherein the medium includes a set of instructions stored thereon that when accessed by a processor enable the processor to perform a method of creating an internet product page and for alerting subscribers of new requirements for a one or more internet product pages, the method comprising:
   querying an administrator to select a new state to add or select a previously entered state to edit;
   querying the administrator whether the state requires QR codes on a one or more products;
   adding the new state to a list of states for a one or more subscribers to select from, if the new state is being added;
   querying the administrator for each of an item of information required by the selected state;
   adding each of the item of information required by the selected state as data fields, titles and descriptions, for product information, batch information, and ingredient information, and/or adding titles and/or descriptions with checkable boxes for tests and information required on a certificate of analysis required by the selected state;
   querying the administrator whether the selected state requires a new item of information not previously required by other previously entered states;
   querying the administrator for a new item of the information required from the subscribers;
   adding the new item of information such that the subscriber will see the new item of information if the subscriber chooses the selected state as a state the subscriber's product will be sold in;
   querying the administrator whether to send a notification to subscribers who had previously selected the selected state as a state the subscriber's product will be sold in;
   sending the notification to the subscriber if the administrator elects to send the notification;
   adding the product to the system;
   querying the subscriber as to which states the product will be sold in;
   querying the subscriber for a product information;
   querying the subscriber for batch information;
   querying the subscriber for ingredients and ingredients information;
   querying the subscriber for certificate of analysis;
   generating a QR code;
   creating an internet product page based on a template that complies with laws and/or regulations of a state with respect to the product, and displaying an internet product page information based on the subscriber queries;
   querying the subscriber whether to link the QR code to the generated substantially compliant internet product page or link the QR code to another internet product page;
   redirecting traffic from URL address encoded in the QR code to the internet product page selected by the subscriber;
   previewing the internet product page selected by the subscriber;
   querying the subscriber if the internet product page will be published or will be kept private;
   publishing the internet product page if the subscriber elected to publish; and
   downloading the QR code to the subscriber.

* * * * *